United States Patent
Hwang et al.

(10) Patent No.: US 7,268,846 B2
(45) Date of Patent: Sep. 11, 2007

(54) DIAMOND LIKE CARBON FILMS

(75) Inventors: Ying-Siang Hwang, Taoyuan (TW); Soo Young Choi, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 27 days.

(21) Appl. No.: 11/263,777

(22) Filed: Oct. 31, 2005

(65) Prior Publication Data

US 2006/0093803 A1    May 4, 2006

Related U.S. Application Data

(60) Provisional application No. 60/624,618, filed on Nov. 3, 2004.

(51) Int. Cl.
*G02F 1/1337* (2006.01)
(52) U.S. Cl. .................................................. 349/123
(58) Field of Classification Search ................. 349/123
See application file for complete search history.

(56) References Cited

U.S. PATENT DOCUMENTS

| | | | | |
|---|---|---|---|---|
| 6,020,946 A * | 2/2000 | Callegari et al. | ........... | 349/124 |
| 6,346,975 B2 * | 2/2002 | Chaudhari et al. | .......... | 349/124 |
| 6,660,341 B2 * | 12/2003 | Andry et al. | ............... | 427/533 |
| 6,836,312 B2 * | 12/2004 | Kato | .......................... | 349/187 |
| 6,995,821 B1 * | 2/2006 | Lu et al. | ..................... | 349/113 |
| 2003/0006252 A1 | 1/2003 | Henry et al. | | |
| 2003/0063252 A1 * | 4/2003 | Kato | .......................... | 349/190 |
| 2004/0105061 A1 * | 6/2004 | Andry et al. | ............... | 349/123 |
| 2004/0108075 A1 * | 6/2004 | Choo et al. | ................. | 156/510 |
| 2004/0151911 A1 * | 8/2004 | Callegari et al. | ........... | 428/408 |
| 2004/0201806 A1 * | 10/2004 | Choo et al. | ................. | 349/129 |
| 2005/0129873 A1 * | 6/2005 | Shukla et al. | ................ | 428/1.1 |
| 2005/0130404 A1 * | 6/2005 | Moghadam et al. | ........ | 438/623 |
| 2005/0263775 A1 * | 12/2005 | Ikeda et al. | .................. | 257/79 |
| 2006/0006424 A1 * | 1/2006 | Yamazaki et al. | .......... | 257/222 |
| 2006/0148252 A1 * | 7/2006 | Loboda et al. | ............. | 438/680 |
| 2006/0150912 A1 * | 7/2006 | Callegari et al. | ..... | 118/723 CB |

OTHER PUBLICATIONS

PCT International Search Report and the Written Opinion for International Application No. PCT/US05/36586 dated Nov. 21, 2006.

* cited by examiner

*Primary Examiner*—James A. Dudek
(74) *Attorney, Agent, or Firm*—Patterson & Sheridan LLP

(57) ABSTRACT

Alignment films for use within a liquid crystal display (LCD) and methods for their manufacture are disclosed. Embodiments of the invention generally relate to process conditions that are selected to improve certain properties of the alignment films. The alignment films include a deposited layer of amorphous carbon, a hydrogenated amorphous carbon film or a hydrogenated diamond-like carbon (DLC) film.

20 Claims, 3 Drawing Sheets

US 7,268,846 B2

DIAMOND LIKE CARBON FILMS

CROSS-REFERENCE TO RELATED APPLICATIONS

This application claims benefit of U.S. provisional patent application Ser. No. 60/624,618, filed Nov. 3, 2004, which is herein incorporated by reference.

BACKGROUND OF THE INVENTION

1. Field of the Invention

Embodiments of the invention generally relate to amorphous carbon films. More particularly, embodiments of the invention relate to hydrogenated diamond-like carbon (DLC) films for use as alignment films within a liquid crystal display (LCD).

2. Description of the Related Art

Active matrix liquid crystal displays (LCDs) are commonly used for applications such as computer and television monitors, cell phone displays, personal digital assistants (PDAs) and an increasing number of other devices. Generally, an active matrix LCD includes two glass plates having a layer of liquid crystal (LC) materials sandwiched therebetween. One of the glass plates typically includes a conductive film disposed thereon. The other glass plate typically includes an array of thin film transistors (TFTs) coupled to an electrical power source. Each TFT may be switched on or off to generate an electrical field between a TFT and the conductive film. The electrical field changes the orientation of the LC material to create a pattern on the LCD.

The LC material employed in the LCD typically relies on alignment layers to orient the LC material in a predetermined direction. The conventional method of LC material alignment includes placing a thin film of the LC material on a mechanically rubbed polyimide film deposited on a suitable substrate of the LCD. Rubbing of the polyimide film creates micro-grooves that the LC material aligns itself with. However, problems with this rubbing method include tracks formed in the polyimide, non-uniformity of the micro-grooves and debris from the cloth used to rub the polyimide. These problems degrade the LCD, necessitate extra cleaning steps and otherwise limit development of the LCD.

More recently, ion-beam treatment on diamond-like carbon (DLC) films used for the alignment of the LC material provides many advantages over conventional rubbed polyimide alignment films, such as, non-contact processing and alignment uniformity. Further, hydrogenated DLC films provide optical transparency suitable for use as the alignment film. Usually, plasma enhanced chemical vapor deposition (PECVD) followed by argon (Ar) ion beam irradiation forms the DLC films that are deposited for use as the alignment film. However, methods heretofore used have affected the desirability of the hydrogenated DLC for use as the alignment film within the LCD. Accordingly, it would be desirable to utilize process conditions that improve certain properties of the alignment film.

Thus, there exists a need for changes in the manufacture of an LCD for deposition of a hydrogenated amorphous carbon film, such as a hydrogenated DLC film, to provide an improved alignment film within the LCD.

SUMMARY OF THE INVENTION

Embodiments of the invention generally relate to process conditions that are selected to improve certain properties of an alignment film within a liquid crystal device (LCD). The alignment film includes a deposited layer of amorphous carbon, a hydrogenated amorphous carbon film, or a hydrogenated diamond-like carbon (DLC) film.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
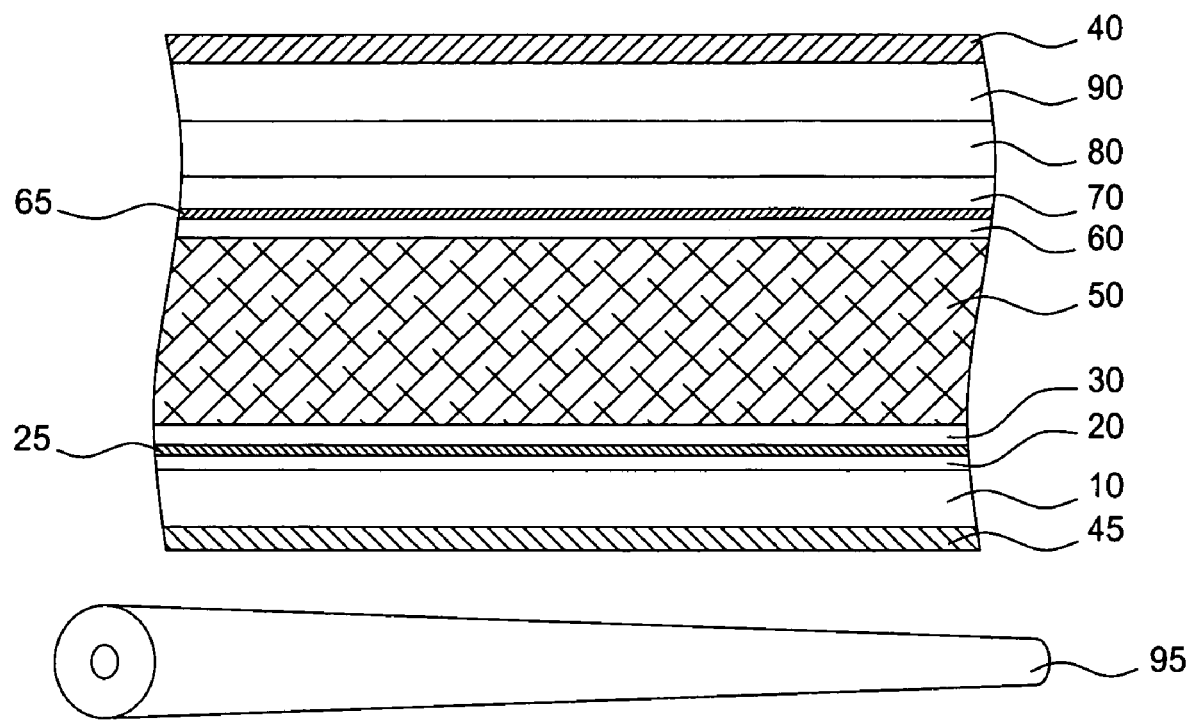
FIG. 1 is a sectional view of an exemplary liquid crystal display (LCD) having alignment films formed according to aspects of the invention.

FIG. 1 illustrates an exemplary liquid crystal display (LCD) having alignment films 30, 60 formed according to aspects of the invention. The LCD includes a lower substrate 10, an upper substrate 90, and a liquid crystal (LC) layer 50 interposed therebetween. The lower substrate 10 can be a glass substrate comprising a thin film transistor (TFT) array. A pixel electrode 20 is formed on the lower substrate 10. A lower alignment film 30 is formed on the pixel electrode 20. A color filter 80 is formed on the interior surface of the upper substrate 90. A common electrode 70 is formed on the color filter 80. An upper alignment film 60 is formed on the common electrode 70. An upper polarizer 40 is disposed (or adhered) on the exterior surface of the upper substrate 90. A lower polarizer 45 is disposed (or adhered) on the exterior surface of the lower substrate 10. A backlight module 95 is disposed below the lower polarizer 45.

According to embodiments of the invention, the alignment films 30, 60 preferably have a high transmittance within a visible range of wavelengths (e.g., greater than 95% at 600 nanometers, more preferably, greater than 99% at 600 nanometers for thicknesses of 200 angstroms), a refractive index that is larger than 1.7, an intrinsic stress that is less than 2.0 giga Pascal, a percentage of sp3 bonds of greater than 70%, a resistivity that is greater than $10^{11}$ Ohm-cm, a density of greater than 1.1 grams/cubic centimeter and a thickness variation of less than 10%. The alignment films 30, 60 can each be approximately 200 angstroms thick. However, other thickness (e.g., 50 to 500 angstroms) may be suitable for the alignment films 30, 60 disclosed. Additionally, as the intrinsic stress increases the alignment films 30, 60 can increasingly tend to peel away from the surfaces on which they are deposited.

Figure 2:
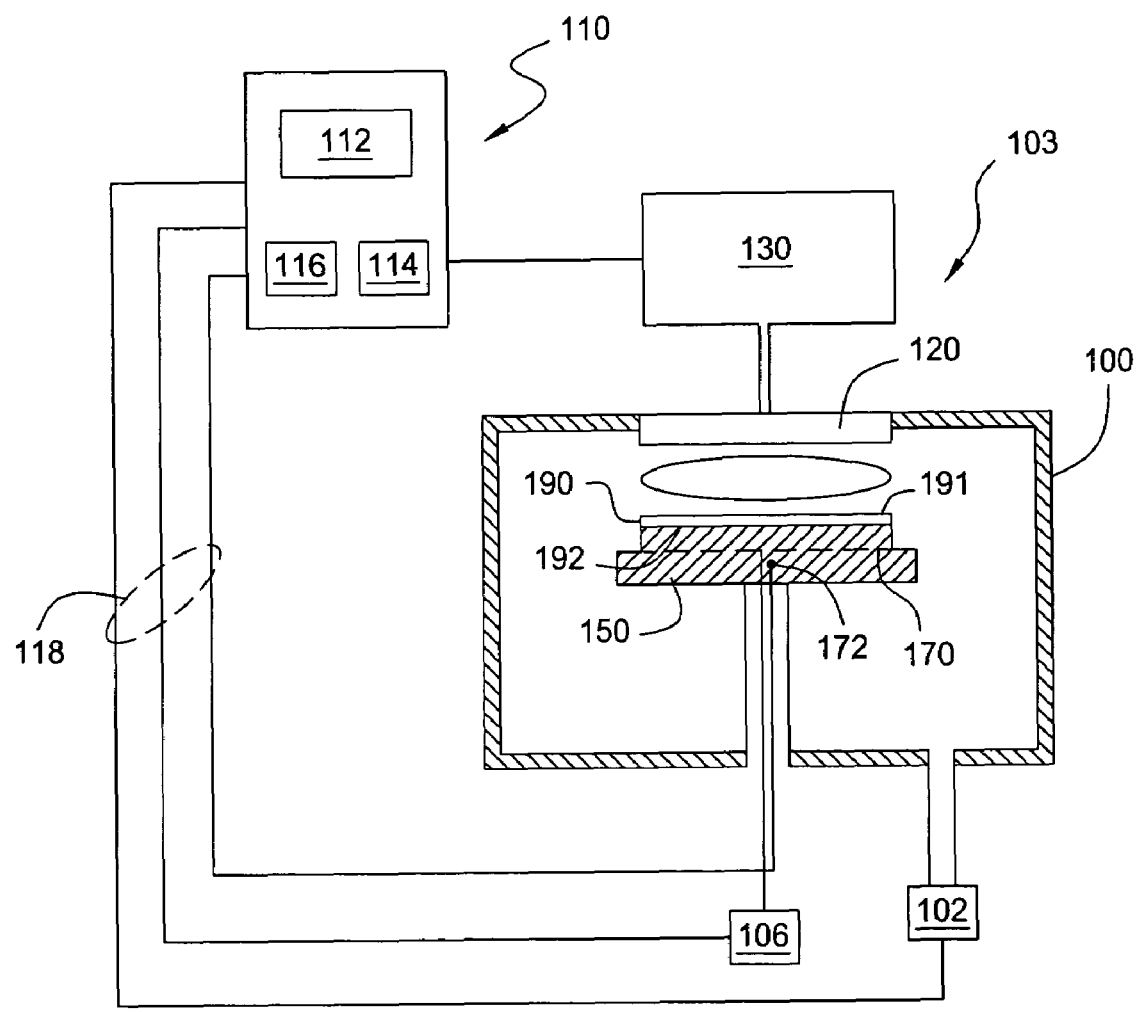
FIG. 2 is a schematic illustration of an apparatus that can be used for deposition of the alignment films.

FIG. 2 is a schematic representation of a substrate processing system 103 that can be used to perform amorphous carbon layer deposition in accordance with the present invention. This apparatus typically comprises a process chamber 100, a gas panel 130 and a control unit 110 along with other hardware components such as power supplies and vacuum pumps. Examples of the system 103 include AKT-1600 PECVD, AKT-4300 PECVD, AKT-5500 PECVD, AKT 10K PECVD, AKT 15K PECVD, AKT 25K PECVD and AKT 40K PECVD systems available from AKT America, Inc., Santa Clara, Calif.

The process chamber 100 generally comprises a support pedestal 150 that holds a substrate 190 of the LCD. Depending on the specific process, the substrate 190 can be heated to some desired temperature prior to processing. An embedded heater element 170 heats the substrate support pedestal 150 and hence the substrate 190 via a bottom surface 192 of the substrate 190 supported above the pedestal 150. For example, the pedestal 150 may be resistively heated by applying an electric current from an AC supply 106 to the heater element 170. A temperature sensor 172, such as a thermocouple, monitors the temperature of the pedestal 150. The measured temperature is used in a feedback loop to control the AC supply 106 for the heating element 170 such that the substrate temperature can be maintained or controlled at a desired temperature which is suitable for the particular process application.

A vacuum pump 102 evacuates the process chamber 100 and maintains the proper gas flows and pressure inside the chamber 100. A showerhead 120, through which process gases are introduced into the chamber 100, is located above the substrate support pedestal 150. The showerhead 120 connects to the gas panel 130, which controls and supplies various gases used in different steps of the process sequence.

The showerhead 120 and substrate support pedestal 150 also form a pair of spaced apart electrodes. When an electric field is generated between these electrodes, the process gases introduced into the chamber 100 are ignited into a plasma. Typically, the electric field is generated by connecting the substrate support pedestal 150 to a source of radio frequency (RF) power (not shown) through a matching network (not shown). Alternatively, the RF power source and matching network may be coupled to the showerhead 120, or coupled to both the showerhead 120 and the substrate support pedestal 150.

Proper control and regulation of the gas flows through the gas panel 130 is performed by mass flow controllers (not shown) and the controller unit 110, such as a computer. Illustratively, the control unit 110 comprises a central processing unit (CPU) 112, support circuitry 114, and memories containing associated control software 116. This control unit 110 is responsible for automated control of the numerous steps required for substrate processing, such as substrate transport, gas flow control, temperature control, chamber evacuation, and so on. Bi-directional communications between the control unit 110 and the various components of the system 103 are handled through numerous signal cables collectively referred to as signal buses 118.

Plasma enhanced chemical vapor deposition (PECVD) techniques promote excitation and/or disassociation of the reactant gases by the application of the electric field to the reaction zone near the substrate surface, creating a plasma of reactive species. The reactivity of the species in the plasma reduces the energy required for a chemical reaction to take place, in effect lowering the required temperature for such PECVD processes.

Amorphous carbon layer deposition to form the alignment films 30, 60 illustrated in FIG. 1 is accomplished by plasma enhanced thermal decomposition of a hydrocarbon compound such as acetylene ($C_2H_2$). For example, acetylene is introduced into the process chamber 100 under the control of gas panel 130. The hydrocarbon compound is introduced into the process chamber as a gas with a regulated flow. The showerhead 120 allows process gases including the hydrocarbon compound from the gas panel 130 to be uniformly distributed and introduced into the process chamber 100.

When the process gas mixture exits the showerhead 120, plasma enhanced thermal decomposition of the hydrocarbon compound occurs at a surface 191 of the heated substrate 190, resulting in a deposition of an amorphous carbon layer on the substrate 190.

For some embodiments of the invention, the amorphous carbon layer is formed from a gas mixture of a hydrocarbon compound and an optional inert gas such as argon (Ar) or helium (He). The hydrocarbon compound has a general formula $C_xH_y$, where x has a range of between 1 and 4 and y has a range of between 2 and 10. For example, acetylene ($C_2H_2$), methane ($CH_4$), propylene ($C_3H_6$), propyne ($C_3H_4$), propane ($C_3H_8$), butane ($C_4H_{10}$), butylene ($C_4H_8$), or butadiene ($C_4H_6$) as well as combinations thereof, may be used as the hydrocarbon compound. Similarly, a variety of gases such as hydrogen ($H_2$), nitrogen ($N_2$), ammonia ($NH_3$), or combinations thereof, among others, may be added to the gas mixture, if desired. An inert gas such as Ar, He and/or $N_2$ may be used to control the density and deposition rate of the amorphous carbon layer. The addition of $H_2$ and/or $NH_3$ can be used to control the hydrogen ratio of the amorphous carbon layer. Additionally, the ratio of the hydrogen to carbon in the hydrocarbon selected can be used to control the hydrogen ratio of the amorphous carbon layer.

In general, the following deposition process parameters can be used to form the amorphous carbon layers that provide the alignment films 30, 60 of the LCD. For some embodiments, the process parameters range from a substrate temperature of about 100° C. to about 200° C., a chamber pressure of about 10 milli-torr to about 2000 milli-torr, a hydrocarbon gas (e.g., $C_2H_2$) flow rate of about 80 standard cubic centimeters per minute (sccm) to about 320 sccm with a $H_2$ flow up to about 1280 sccm, an RF power of between about 125 watts to about 1000 watts, and a spacing of between about 700 mils to about 1300 mils between the shower head and the substrate. These processes were run on an AKT-1600 PECVD system having an internal volume of about 48 liters and being capable of processing substrates having an area up to 2,000 square centimeters. The substrate processed was 370 mm by 470 mm.

Other deposition chambers are within the scope of the invention and the parameters listed above may vary according to the particular deposition chamber used to form the amorphous carbon layer. For example, other deposition chambers may have a larger or smaller volume, requiring gas flow rates that are larger or smaller than those recited for deposition chambers available from Applied Materials, Inc. In this respect, the deposition process parameters used to form the alignment films 30, 60 can include an RF power of about 0.05 watts per square centimeter ($W/cm^2$) to about 0.6 $W/cm^2$. Additionally, gas density for $C_2H_2$ can be between 1.5 cubic centimeters per liter (cc/L) and 7.0 cc/L. If present, gas density for $H_2$ can be between 3.0 cc/L and 27.0 cc/L and for Ar can be between 3.0 cc/L and 14.0 cc/L.

The deposited amorphous carbon layer has an adjustable carbon:hydrogen ratio that ranges from about 10% hydrogen to about 60% hydrogen. For some embodiments, the layer is about 40% hydrogen to about 50% hydrogen. Controlling the hydrogen ratio of the amorphous carbon layer is desirable for tuning its optical properties. Specifically, as the hydrogen ratio decreases the optical properties of the deposited layer such as the index of refraction (n) and the absorption coefficient (k) increase. Due to the relative $H_2$ flow rate and the ratio of carbon:hydrogen present in the selected hydrocarbon, the carbon:hydrogen ratio present in the chamber can be 1:4, 8:1,16:1 or 1:1.

Upper and lower adhesion layers 25, 65 may optionally be deposited on the respective electrodes 20, 70 prior to depositing the alignment films 30, 60. Peeling of the alignment films 30, 60 from the electrodes 20, 70 can potentially occur due to insufficient adherence when directly applied to coatings, such as indium-tin-oxide (ITO), that form the electrodes 20, 70 on the substrates 10, 90. Accordingly, the adhesion layers 25, 65 aid in preventing the alignment films 30, 60 from peeling away from the electrodes 20, 70 after being deposited.

For some embodiments, the adhesion layers 25, 65 are formed from an amorphous silicon (a-Si), silicon nitride (SiN), silicon oxynitride (SiON), or silicon oxide (SiO). The adhesion layers 25, 65 can be thin, for example, less than about 20 angstroms and preferably about 5 angstroms. The thinness of the adhesion layers 25, 65 increases transmittance through the adhesion layers 25, 65 since the adhesion layers 25, 65 may not be transparent.

In general, the following deposition process parameters can be used to form the adhesion layers 25, 65. For some embodiments where the adhesion layers 25, 65 are a-Si, the process parameters include a substrate temperature of about 150° C., a chamber pressure of about 2100 milli-torr, a silane ($SiH_4$) gas flow rate of about 200 sccm with a $H_2$ flow up to about 1000 sccm, an RF power of about 200 watts, and a spacing of about 520 mils between the shower head and the substrate. These processes were run on an AKT-3500 PECVD system having an internal volume of about 124 liters and being configured to process a substrate that is 550 mm by 650 mm.

According to aspects of the invention, the deposition process parameters used to form the adhesion layers 25, 65 include an RF power of about 0.02 W/cm² to about 0.2 W/cm². Additionally, gas density is between 0.2 cc/L and 9.0 cc/L for $SiH_4$, between 0.5 cc/L and 5.0 cc/L for ammonia ($NH_3$), between 2.5 cc/L and 25.0 cc/L for nitrogen ($N_2$), and/or between 3.0 cc/L and 45.0 cc/L for nitrous oxide ($N_2O$) depending on the composition selected for the adhesion layers 25, 65.

EXAMPLES

Table 1 illustrates various examples of several embodiments of the invention that produced samples of amorphous carbon layers. These amorphous carbon layers are suitable for use within the LCD as the alignment films 30, 60. While $C_2H_2$ is used as the hydrocarbon, the process can be modified to obtain similar results. For example, $CH_4$ at 320 sccm and $H_2$ at 320 sccm provides an equivalent C:H ratio.

TABLE 1

|  | $C_2H_2$ (sccm) | $H_2$ (sccm) | Ar (sccm) | Power (W) | Pres. (mT) | Spacing (mils) | Temp (° C.) |
|---|---|---|---|---|---|---|---|
| Example 1 | 160 | 640 | 0 | 500 | 300 | 1000 | 150 |
| Example 2 | 320 | 0 | 0 | 200 | 100 | 700 | 100 |
| Example 3 | 320 | 0 | 160 | 500 | 200 | 1000 | 150 |
| Example 4 | 320 | 160 | 160 | 500 | 200 | 1000 | 150 |
| Example 5 * | 320 | 1280 | 0 | 800 | 300 | 1000 | 150 |

\* Example 5 was run on an AKT-3500 PECVD system having an internal volume of about 124 liters to process a substrate that was 550 mm by 650 mm while Examples 1-4 were run on the AKT-1600 PECVD system to process substrates that were 370 mm by 470 mm, thereby illustrating the ability to scale up.

Table 2 shows some properties associated with films formed utilizing inputted parameters for the examples as defined in Table 1. Varying one or more of the following process parameters: the flow rates of $C_2H_2$ and $H_2$; the RF power; the pressure in the chamber; the temperature of the substrate; and the spacing between the shower head and the substrate, produces an amorphous carbon film with unique combinations of parameters. These parameters include transparency, hydrogen content, sp3 bond percentage, intrinsic stress shown in Table 2 as giga Dyne per square centimeter, refractive index (RI), and resistivity. Accordingly, the appropriate process parameters can be selected to improve the amorphous carbon layer used for the alignment film.

TABLE 2

|  | RI | Stress (E9D/cm²) |
|---|---|---|
| Example 1 | 1.714 | −7.0 |
| Example 2 | 1.787 | −8.4 |
| Example 3 | 1.780 | −4.9 |
| Example 4 | 1.767 | −5.8 |

In addition to the properties shown in Table 2, it has been determined by Rutherford Backward Scattering that a film created by Example 1 has a hydrogen percentage of 42% and a carbon percentage of 58%. Similarly, Example 5 has a hydrogen percentage of 42.5% and a carbon percentage of 57.5%. In addition, the density of Example 1 has been calculated to be 1.3477 g/cm³.

Figure 3:
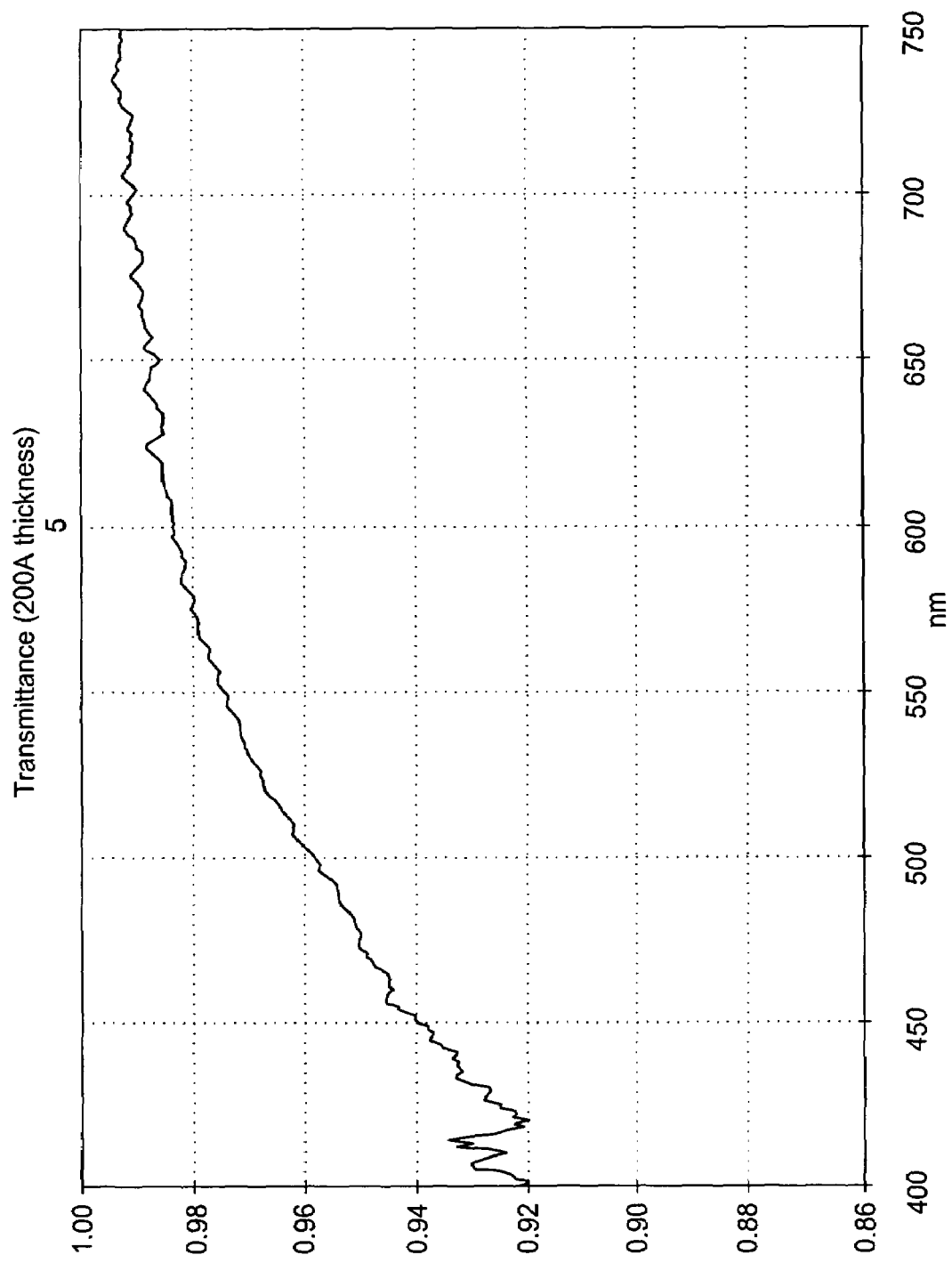
FIG. 3 is a graph of transmittance verses wavelength through a 200 angstrom thick film deposited in accordance with Example 1.

FIG. 3 shows a graph of transmittance verses wavelength through a 200 angstrom thick film deposited in accordance with Example 1. Transmittance at 450 nm is 94.0% and is 98.4% at 600 nm. If desired, transmittance can be increased by reducing the thickness of the film.

While the foregoing is directed to embodiments of the present invention, other and further embodiments of the invention may be devised without departing from the basic scope thereof, and the scope thereof is determined by the claims that follow.

The invention claimed is:

1. An alignment film for use in a liquid crystal display (LCD), comprising
    an amorphous carbon deposition layer having a transmittance through 200 angstroms of the layer of greater than 98% at 600 nanometers, a refractive index that is larger than 1.7, an intrinsic stress that is less than 2.0 giga Pascal, a percentage of sp3 bonds of greater than 70%, a resistivity that is greater than $10^{11}$ Ohm-cm, and a thickness variation of less than 10%.

2. The alignment film of claim 1, wherein the amorphous carbon deposition layer has a density of greater than 1.1 grams per cubic centimeter.

3. The alignment film of claim 1, wherein the amorphous carbon deposition layer has a hydrogen concentration of between about 10% and about 60%.

4. The alignment film of claim 1, wherein the amorphous carbon deposition layer has a hydrogen concentration of about 42% and a carbon concentration of about 58%.

5. The alignment film of claim 1, wherein the amorphous carbon deposition layer has a thickness of about 200 angstroms.

6. A substrate having an alignment film deposited for use in a liquid crystal display (LCD), comprising:
    an adhesion layer deposited on an electrode disposed on the substrate; and
    an amorphous carbon deposition layer deposited on the adhesion layer to provide the alignment film, wherein the amorphous carbon deposition layer has a percentage of sp3 bonds of greater than 70%.

7. The substrate having an alignment film of claim 6, wherein the adhesion layer includes a material selected from at least one member of the group consisting of a-Si, SiN, SiON and SiO.

8. The substrate having an alignment film of claim 6, wherein the adhesion layer is deposited on an indium-tin-oxide coating that forms the electrode.

9. The substrate having an alignment film of claim 6, wherein the amorphous carbon deposition layer has a thickness of about 50 to 500 angstroms.

10. A substrate having an alignment film deposited for use in a liquid crystal display (LCD), comprising:
   an adhesion layer deposited on an electrode disposed on the substrate; and
   an amorphous carbon deposition layer deposited on the adhesion layer to provide the alignment film, wherein the amorphous carbon deposition layer has a hydrogen concentration of between about 10% and about 60%.

11. The substrate having an alignment film of claim 10, wherein the amorphous carbon deposition layer has a hydrogen concentration of between about 40% and about 50%.

12. A substrate having an alignment film deposited for use in a liquid crystal display (LCD), comprising:
   an adhesion layer deposited on an electrode disposed on the substrate; and
   an amorphous carbon deposition layer deposited on the adhesion layer to provide the alignment film, wherein the amorphous carbon deposition layer has an intrinsic stress that is less than 2.0 giga Pascal.

13. A substrate having an alignment film deposited for use in a liquid crystal display (LCD), comprising:
   an adhesion layer deposited on an electrode disposed on the substrate; and
   an amorphous carbon deposition layer deposited on the adhesion layer to provide the alignment film, wherein the amorphous carbon deposition layer has a refractive index that is larger than 1.7, an intrinsic stress that is less than 2.0 giga Pascal, a percentage of sp3 bonds of greater than 70%, a resistivity that is greater than $10^{11}$ Ohm-cm, and a thickness variation of less than 10%.

14. A liquid crystal display (LCD) having amorphous carbon alignment films, comprising:
   a first substrate;
   a pixel electrode disposed on the first substrate;
   a first alignment film disposed on the pixel electrode;
   a second substrate;
   a second alignment film disposed on the second substrate; and
   a liquid crystal (LC) layer interposed between the second and first alignment films, wherein the second and first alignment films are amorphous carbon deposition layers having a refractive index that is larger than 1.7, an intrinsic stress that is less than 2.0 giga Pascal, a percentage of sp3 bonds of greater than 70%, and a hydrogen concentration less than 60%.

15. The LCD of claim 14, further comprising a first adhesion layer disposed between the pixel electrode and the first alignment film and a second adhesion layer disposed between the second substrate and the second alignment film.

16. The LCD of claim 15, wherein the adhesion layers include a material selected from at least one member of the group consisting of a-Si, SiN, SiON and SiO.

17. The LCD of claim 16, wherein the adhesion layers each have a thickness of less than 20 angstroms.

18. The LCD of claim 17, wherein the alignment films each have a thickness of about 50 to 500 angstroms.

19. The LCD of claim 16, wherein the adhesion layers each have a thickness of about 5 angstroms.

20. The LCD of claim 15, wherein the pixel electrode comprises an indium-tin-oxide coating.

* * * * *